(12) United States Patent
Honda et al.

(10) Patent No.: US 7,066,436 B2
(45) Date of Patent: Jun. 27, 2006

(54) BOX DEVICE

(75) Inventors: Itsuo Honda, Hilliard, OH (US); Atsushi Takahashi, Columbus, OH (US); Kazuomi Sakata, Yamato (JP)

(73) Assignee: Nifco Inc., Yokohama (JP)

( * ) Notice: Subject to any disclaimer, the term of this patent is extended or adjusted under 35 U.S.C. 154(b) by 131 days.

(21) Appl. No.: 10/854,202

(22) Filed: May 27, 2004

(65) Prior Publication Data
US 2005/0006546 A1 Jan. 13, 2005

(30) Foreign Application Priority Data
Jul. 9, 2003 (JP) ............................. 2003-193985

(51) Int. Cl.
*A47K 1/08* (2006.01)

(52) U.S. Cl. ................................ 248/311.2; 220/254.9; 220/345.5

(58) Field of Classification Search ............ 248/311.2, 248/310, 315; 224/926; 211/71.01; 220/737, 220/254.9, 345.5, 529; 108/44; 312/323, 312/350; 297/188.14, 188.19
See application file for complete search history.

(56) References Cited

U.S. PATENT DOCUMENTS

| | | | | | |
|---|---|---|---|---|---|
| 4,659,136 | A | * | 4/1987 | Martin et al. | 296/100.04 |
| 4,757,913 | A | * | 7/1988 | Yerman | 220/345.5 |
| 4,927,108 | A | * | 5/1990 | Blazic et al. | 248/311.2 |
| 4,974,898 | A | * | 12/1990 | Baranski | 296/100.03 |
| 5,297,767 | A | * | 3/1994 | Miller et al. | 248/311.2 |
| 6,059,243 | A | * | 5/2000 | Hikage et al. | 248/311.2 |
| 6,942,267 | B1 | * | 9/2005 | Sturt | 296/24.34 |

FOREIGN PATENT DOCUMENTS

JP 2554941 8/1997

* cited by examiner

Primary Examiner—Robert P. Olszewski
Assistant Examiner—Timothy S. Smith
(74) Attorney, Agent, or Firm—Manabu Kanesaka

(57) ABSTRACT

A box device includes a box body having a housing portion with an upper opening, and a front movable member and a rear movable member slidably disposed in front and rear directions in the box body for opening and closing the upper opening of the housing portion. The box device further includes a first guide portion engaging the front movable member for guiding the front movable member to slide in the front and rear directions; a second guide portion engaging the rear movable member for guiding the rear movable member to slide in the front and rear directions; and an engaging device for connecting and disconnecting the front movable member and the rear movable member.

6 Claims, 7 Drawing Sheets

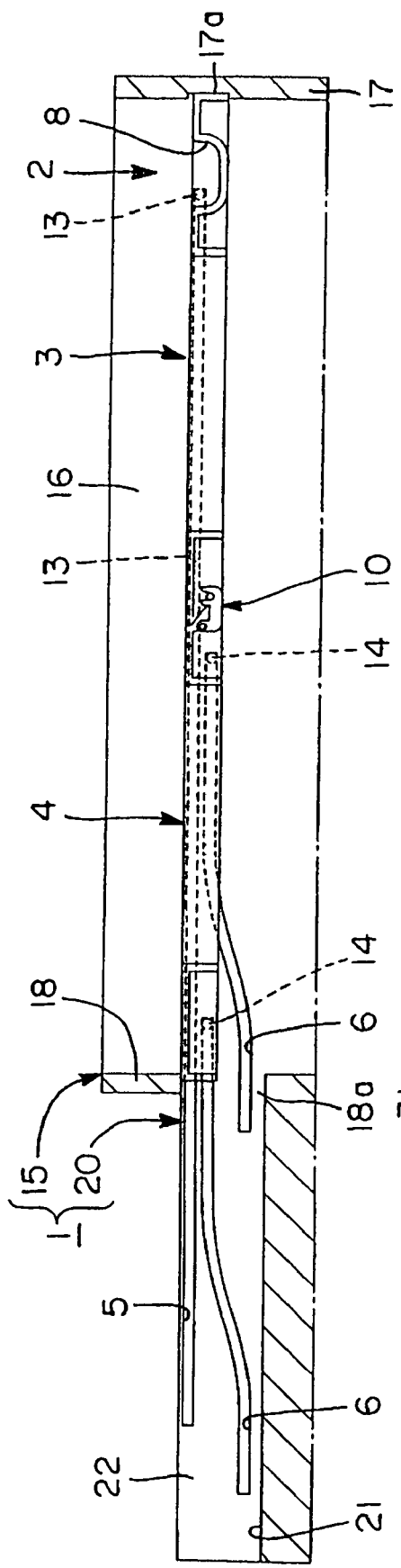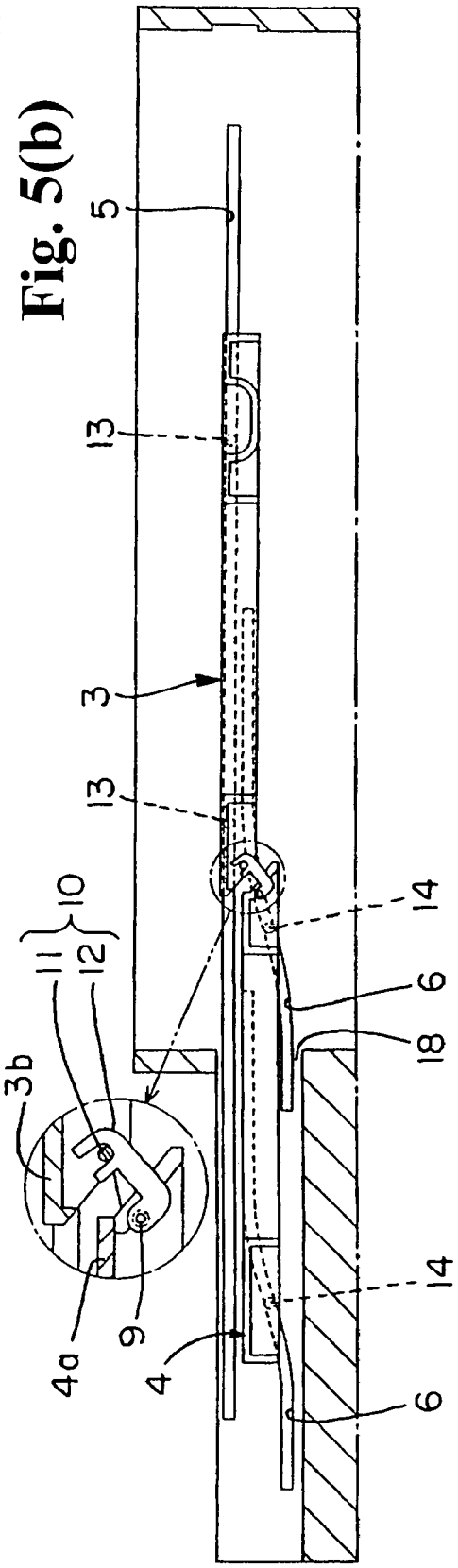

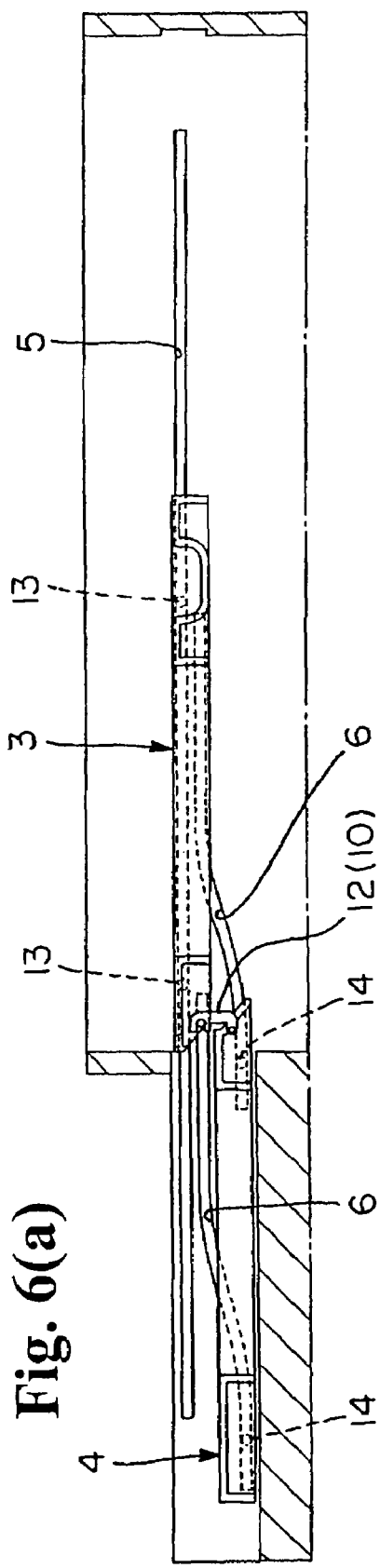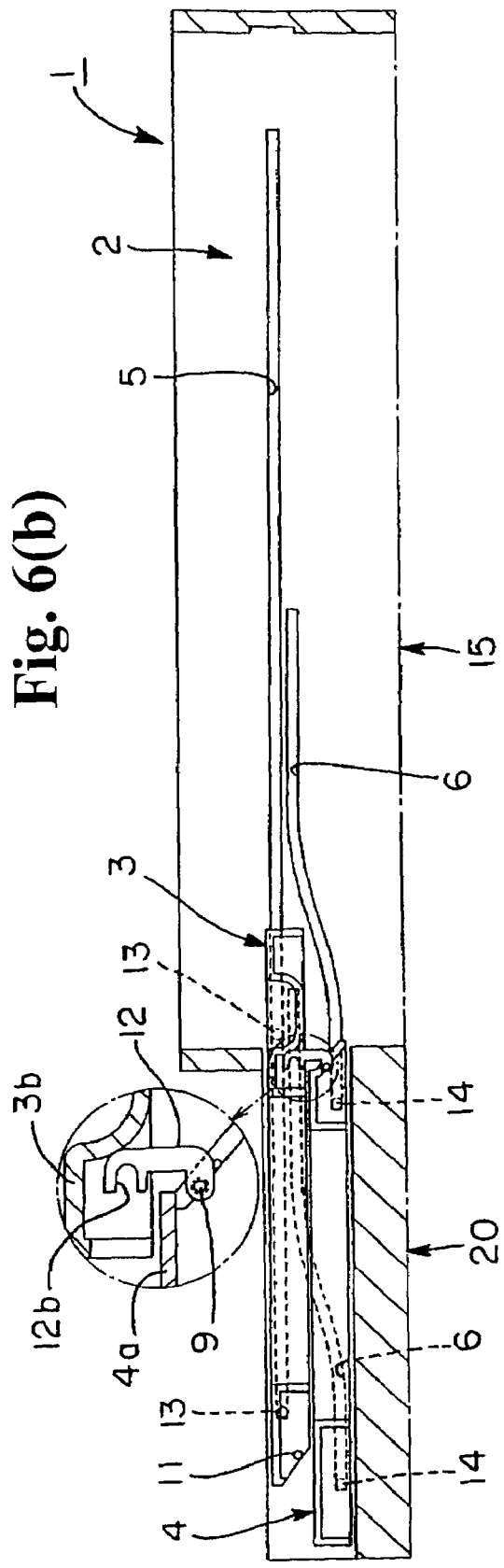

Fig. 7(a) Prior Art
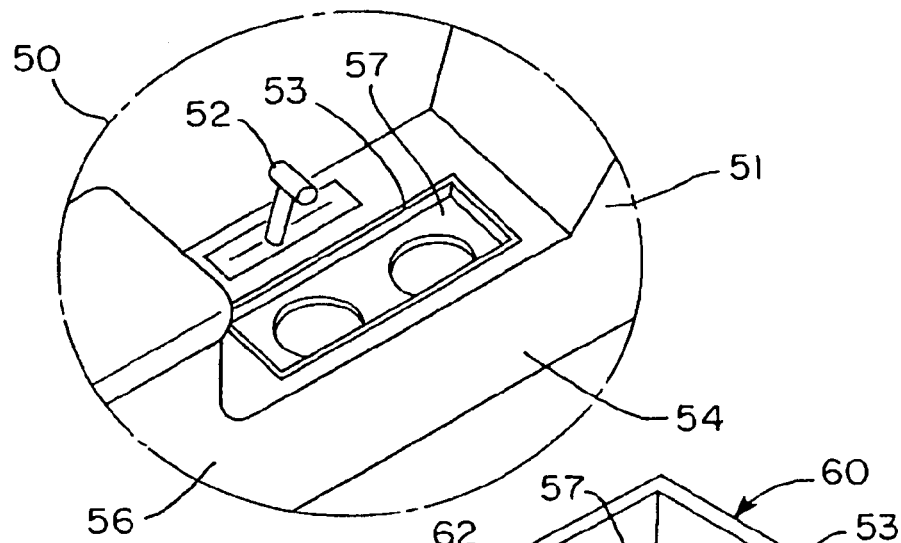
Fig. 7(b) Prior Art
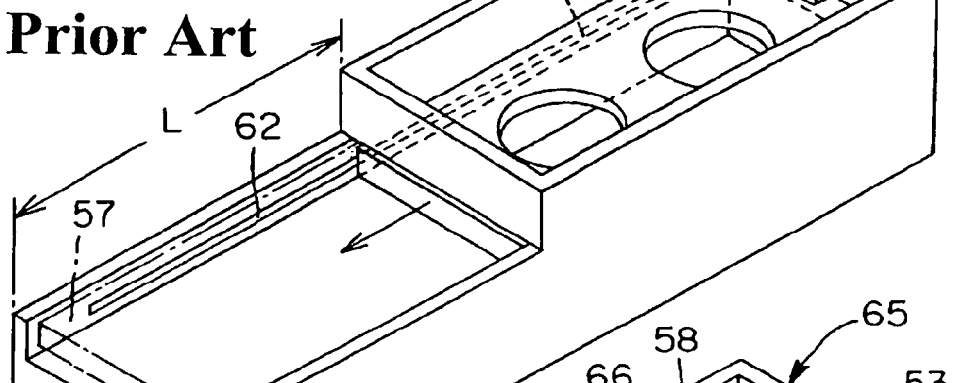
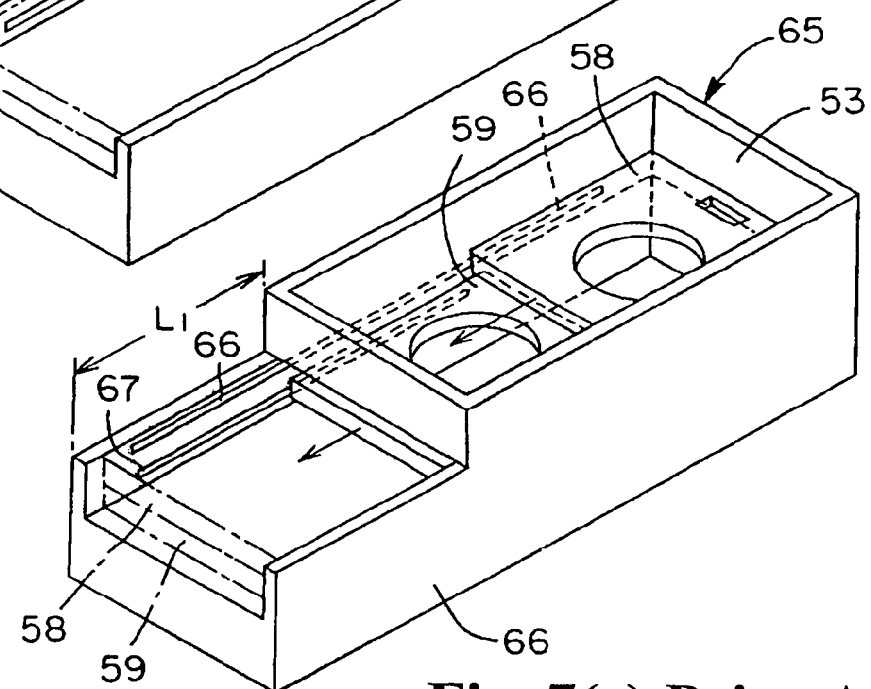
Fig. 7(c) Prior Art

BOX DEVICE

BACKGROUND OF THE INVENTION AND RELATED ART STATEMENT

The present invention relates to a box device including a housing portion with an upper opening, in which the upper opening of the housing portion opens and closes when a movable member slides in a front to rear direction.

FIG. 7(a) is a schematic view showing a center console portion of an automobile. A center console portion 50 integrally includes a section 51 extending from a front side to a rear side of a vehicle toward an instrument panel; a section 54 provided with a control lever 52 and a housing portion 53; and a section 56 provided with a housing portion 55 having a rotatable cover. The housing portion 53 is disposed adjacent to the control lever 52 and has an upper opening extending in a front to rear direction. The upper opening opens and closes when a movable member 57 slides in the front to rear direction.

FIGS. 7(b) and 7(c) are views showing box bodies 60 and 65 forming the housing portion 53. The box bodies 60 and 65 include block portions 61 and 66 to be provided at a rear portion of the housing portion 53. The block portions 61 and 66 are installed in the section 54 of the center console portion 50.

The box body 60 shown in FIG. 7(b) has the movable member 57 formed of a single plate for opening and closing the upper opening of the housing portion 53. The movable member 57 has shafts (not shown) fitted in linear guide grooves 62 formed in sidewalls of the housing portion 53 and extending toward a corresponding part of the block 61. The movable member 57 slides between a closed position wherein the upper opening of the housing portion 53 is closed and an open position wherein the upper opening of the housing portion 53 is substantially fully opened when the movable member 5 slides toward the block 61 as indicated by solid lines. In this structure, the block portion 61 needs to have a length L corresponding to a length of the movable member 57, so that the box body 60 becomes larger and heavy.

The box body 65 shown in FIG. 7(c) has a structure wherein the movable member is divided into a front movable member 58 and a rear movable member 59 similar to a structure disclosed in Japanese Utility Model (Kokai) No. 2554941. In this structure, two guide grooves 66 and 67 are provided parallel to sidewalls defining the housing portion 53 and corresponding portions of a block portion 66. The front movable member 58 slides from a closed position indicated by solid lines to an open position indicated by hidden lines along the guide grooves 66, and the rear movable member 59 slides from a closed position indicated by solid lines to an open position indicated by hidden lines along the guide grooves 67.

In the structure shown in FIG. 7(c), the movable members are overlapped, thereby reducing a length L1 of the block portion 66 and improving design flexibility. However, in the closed state of the upper opening of the housing portion 53, there is a step between the front movable member 58 and the rear movable member 59, thereby deteriorating the appearance. In the opening and closing operation, it is necessary to slide the movable members 58 and 59 independently, thereby making the operation inconvenient.

In view of the problems described above, the present invention has been made, and an object of the invention is to provide a box device with improved appearance in a closed position where movable members are closed, and the opening and closing operations are improved.

Further objects and advantages of the invention will be apparent from the following description of the invention.

SUMMARY OF INVENTION

In order to achieve the objects described above, according to the present invention, a box device includes a box body having a housing portion with an upper opening, and a front movable member and a rear movable member sliding respectively in a front to rear direction for opening and closing the upper opening of the housing portion. The box device further includes a first guide portion formed in the box body and engaging the front movable member for guiding the front movable member to slide in the front to rear direction; a second guide portion formed in the box body and engaging the rear movable member for guiding the rear movable member to slide in the front to rear direction; and engaging means for connecting and disconnecting the front movable member and the rear movable member. When the front movable member and the rear movable member slide from the closed position, where the front movable member and the rear movable member are connected through the engaging means at a same level to close the housing portion, to the open position to open the housing portion, the front movable member and the rear movable member can be separated through the engaging means, and disposed above and below each other along the corresponding guide portions.

In the structure of the present invention, the front movable member is connected to the rear movable member through the engaging means to be separable. When the front movable member slides forward from the open position to the closed position, the front member is connected to the rear movable member through the engaging means so that the rear movable member moves in the same direction, and the front movable member is flash with the rear movable member at the closed position. When the movable members slide backward from the closed position to the open position, the movable members are separated through the engaging means, the movable members are disposed above and below according to the guide portions. Accordingly, even though the movable members are divided, it is possible to eliminate a step between the movable members at the closed position. The rear movable member slides in the direction same as that of the front movable member through the engaging means when the front movable member slides toward the open or closed position, thereby improving the opening and closing operations.

In the structure of the present invention, the first guide portion may be formed of a straight groove so that the front movable member slides substantially horizontally through shafts formed on the front movable member. The second guide portion may be provided below the first guide portion, and may be formed of a plurality of nonlinear grooves so that the rear movable member slides substantially horizontally with a vertical movement through shafts formed thereon. Accordingly, the rear movable member slides substantially horizontally along a plurality of the nonlinear grooves, thereby enabling a smooth operation and a high-quality product. The guide portions, especially the first guide portion, may not have a groove shape, and a guide protrusion may be formed instead of the groove and may be fitted in a groove formed in the movable member.

In the structure of the present invention, the engaging means may include an engaging member provided on a rear inner side of the front movable member and a locking member provided on a front inner side of the rear movable member to be rotatable. The locking member is disengaged from the engaging member when the front movable member slides from the closed position to the open position, and engages the engaging member when the front movable member slides from the open position to the closed position. Accordingly, the engaging means has a simple structure, and the engaging means can be modified.

In the structure of the present invention, the box body may include a block portion provided at a backside of the housing portion, and the first guide portion and the second guide portion extend from the housing portion to the block portion. Accordingly, the front and rear movable members slide in the block portion at the open position, thereby making it easy to handle an article in and out of the housing portion, and to utilize the inside of the housing portion effectively.

In the structure of the present invention, at least one of the front movable member and the rear movable member may include a holder hole for holding a container inserted from above. Accordingly, one of the movable members has such a specific structure, and as far as the movable members slide in the front to rear direction (longitudinal direction of the housing portion) relative to the housing portion, the movable members may be regular lids or shielding members.

BRIEF DESCRIPTION OF THE DRAWINGS

FIGS. 1(a) and 1(b) are perspective views of a box device according to an embodiment of the present invention, wherein FIG. 1(a) shows a state that movable members are located at a closed position, and FIG. 1(b) shows a state that the movable members are located at an open position;

FIGS. 2(a) and 2(b) are perspective views showing members of the box device, wherein FIG. 2(a) is a view of a box body, and FIG. 2(b) is a view of a front movable member and a rear movable member;

FIGS. 3(a) to 3(c) are enlarged sectional views showing essential parts of the front and rear movable members shown in FIGS. 2(a) and 2(b), wherein FIG. 3(a) is a sectional view taken along line 3(a)—3(a) in FIG. 2(b), FIG. 3(b) is a sectional view taken along line 3(b)—3(b) in FIG. 2(b), and FIG. 3(c) is a sectional view taken along line 3(c)—3(c) in FIG. 2(b);

FIGS. 5(a) and 5(b) are views showing an operation of the box device, wherein FIG. 5(a) is a state that the front and rear movable members are at the closed position to close an upper opening of the housing portion, and FIG. 5(b) is a state that the front and rear movable members slide from the closed position to the open position;

FIGS. 6(a) and 6(b) are views showing an operation of the box device, wherein FIG. 6(a) is a state that the front and rear movable members further slide toward the open position, and FIG. 6(b) is a state that the front and rear movable members are located at the open position to open the upper opening of the housing portion; and FIGS. 7(a) to 7(c) are views showing conventional box devices, wherein FIG. 7(a) is a schematic view showing a center console portion of an automobile, FIG. 7(b) is a view showing a conventional box device, and FIG. 7(c) is a view showing another conventional box device.

DETAILED DESCRIPTION OF PREFERRED EMBODIMENTS

Figure 1A:
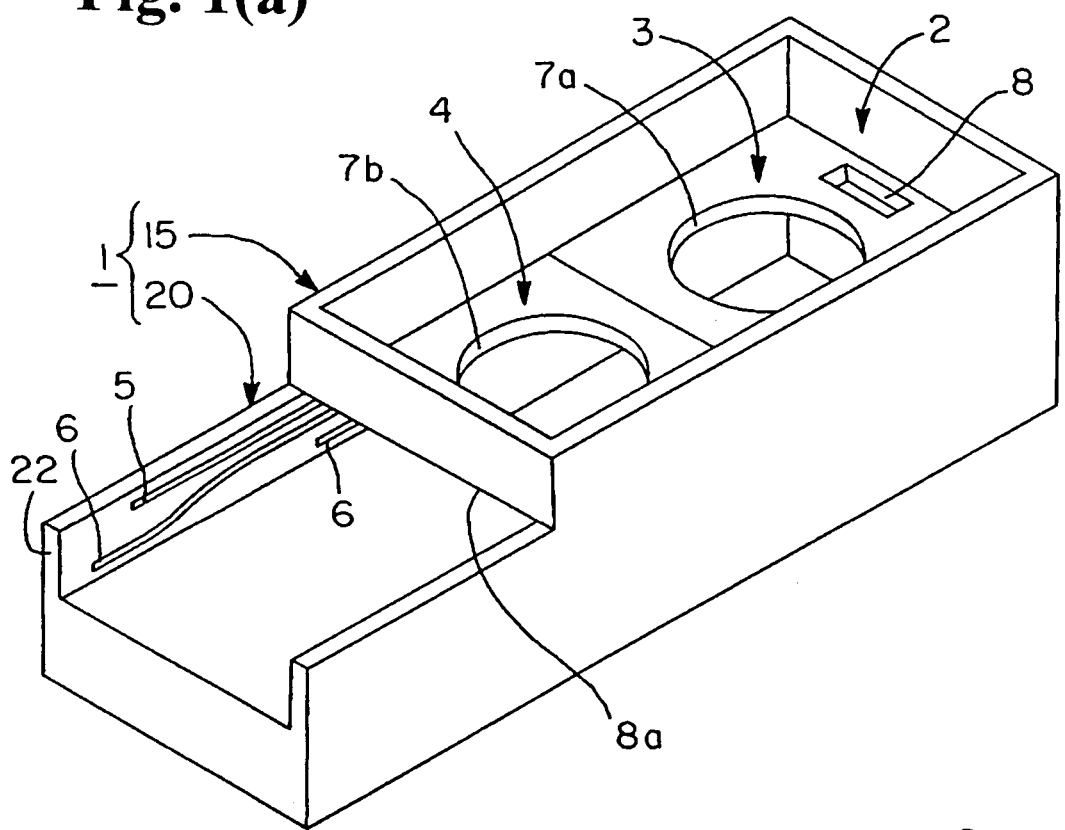
Figure 1B:
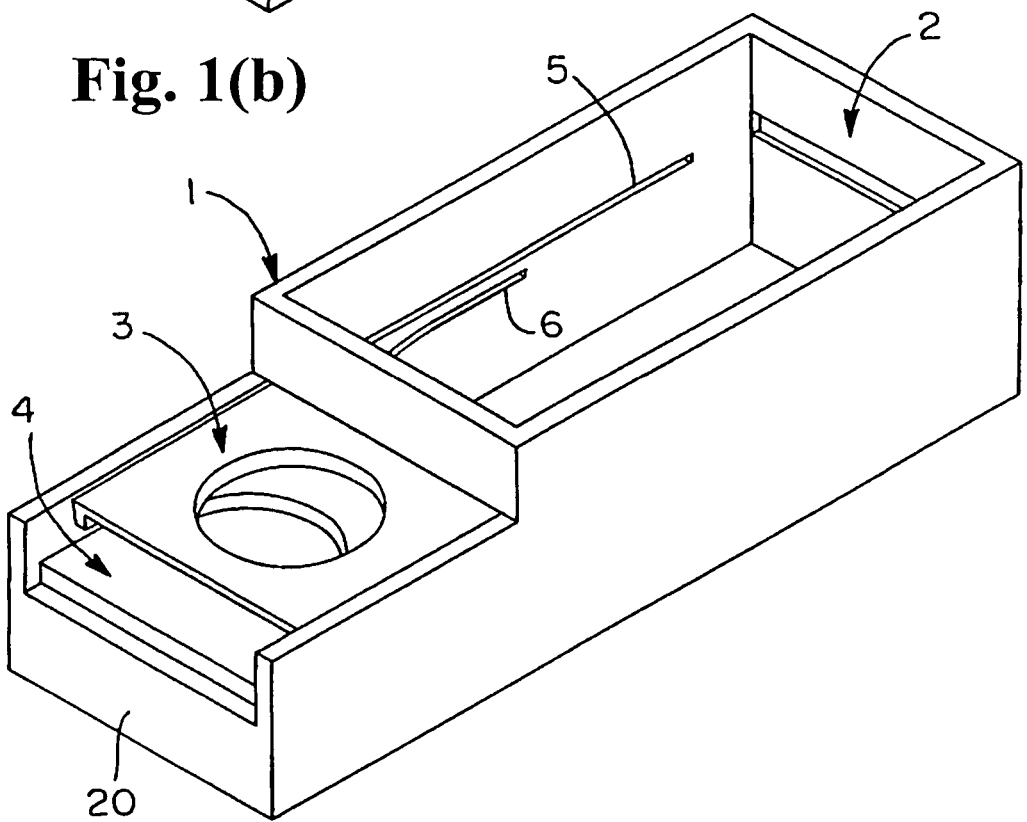
Figure 2A:
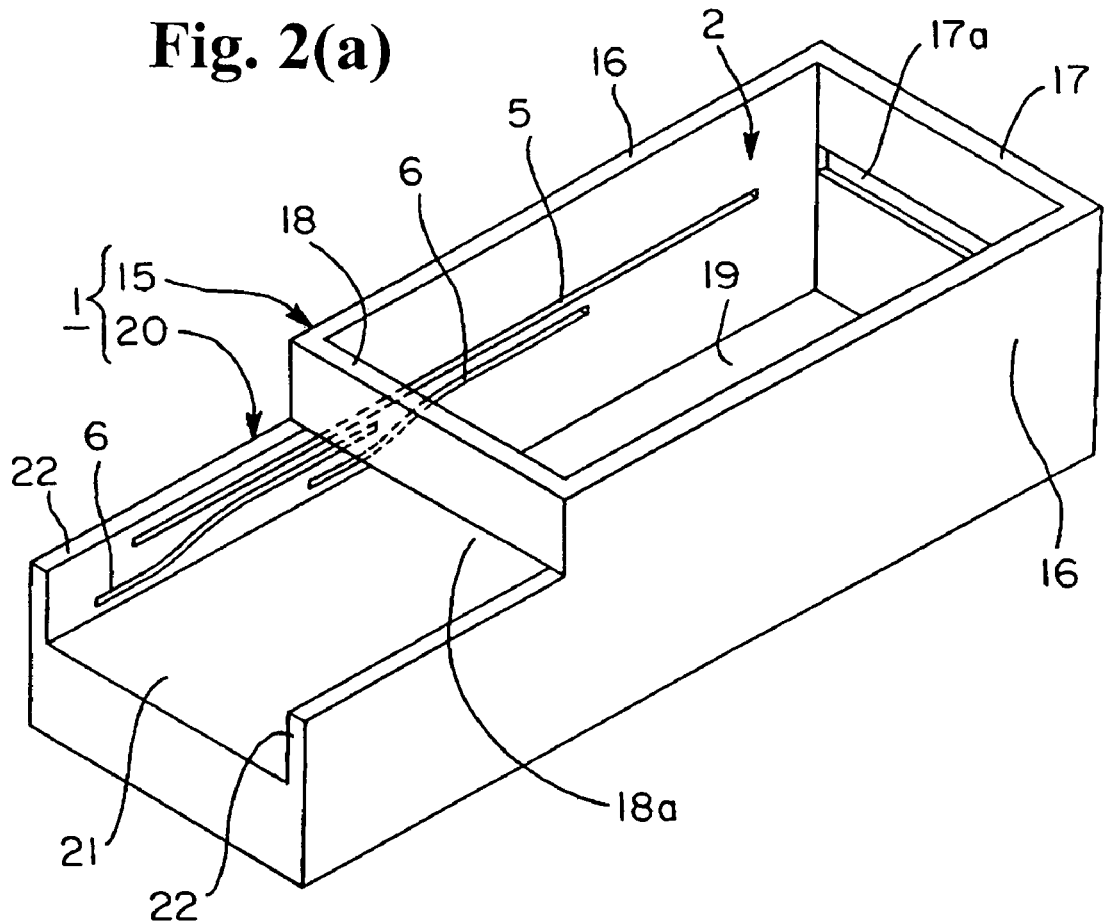
Figure 2B:
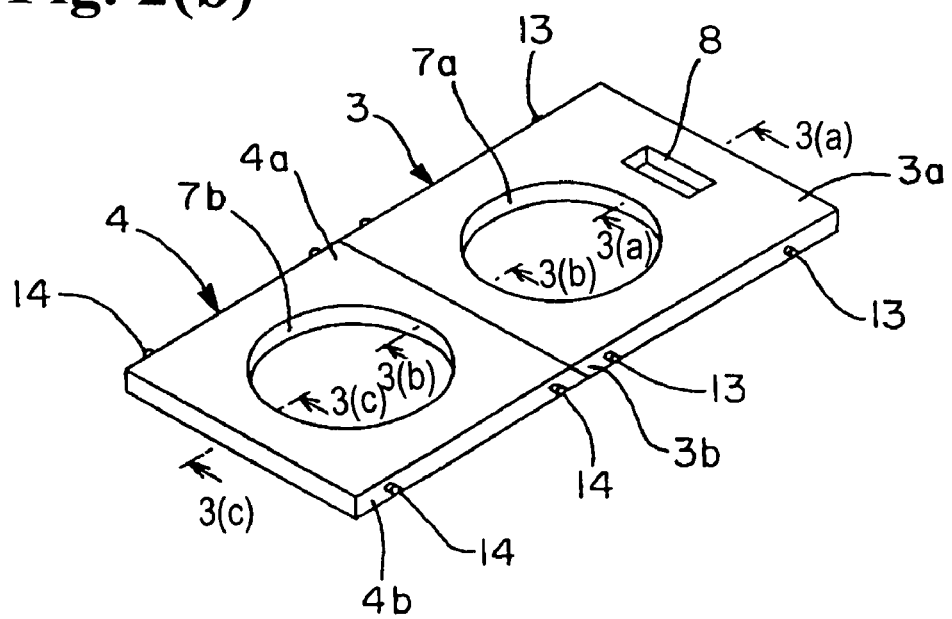
Figure 3A:
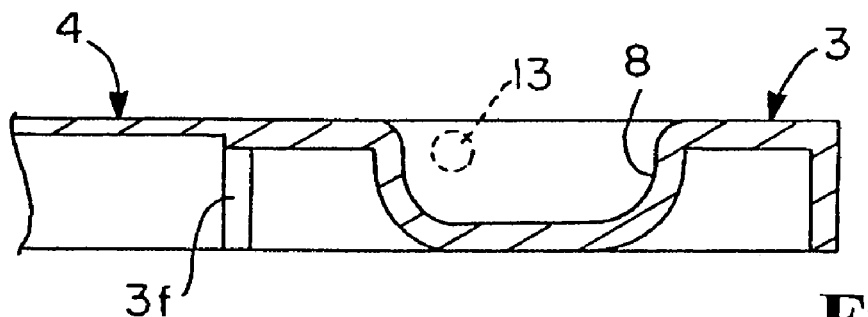
Figure 3B:
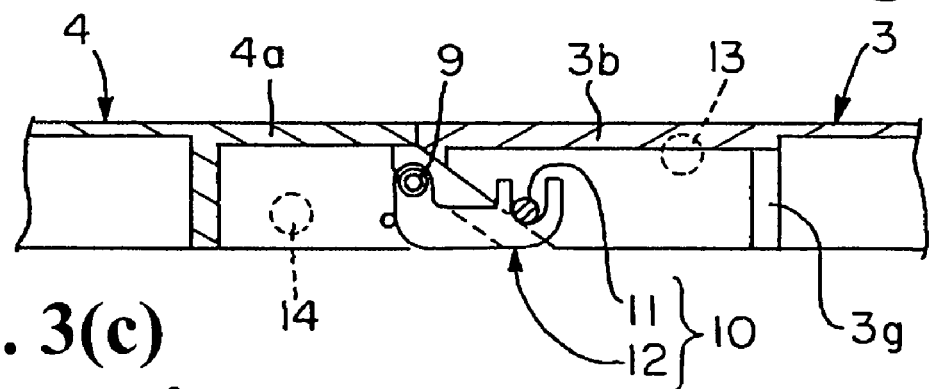
Figure 3C:
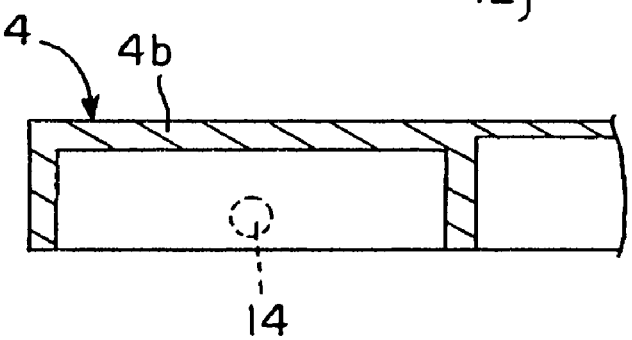

Hereunder, embodiments of the present invention will be described with reference to the accompanying drawings. FIGS. 1(a) and 1(b) are perspective views of a box device according to an embodiment of the present invention, wherein FIG. 1(a) shows a state that movable members are located at a closed position, and FIG. 1(b) shows a state that the movable members are located at an open position. FIGS. 2(a) and 2(b) are views showing members of the box device, wherein FIG. 2(a) is a view of the box body, and FIG. 2(b) is a view of a front movable member and a rear movable member. FIGS. 3(a) to 3(c) are enlarged sectional views showing essential parts of the front and rear movable members shown in FIGS. 2(a) and 2(b), wherein FIG. 3(a) is a sectional view taken along line 3(a)—3(a) in FIG. 2(b), FIG. 3(b) is a sectional view taken along line 3(b)—3(b) in FIG. 2(b), and FIG. 3(c) is a sectional view taken along line 3(c)—3(c) in FIG. 2(b).

Figure 4:
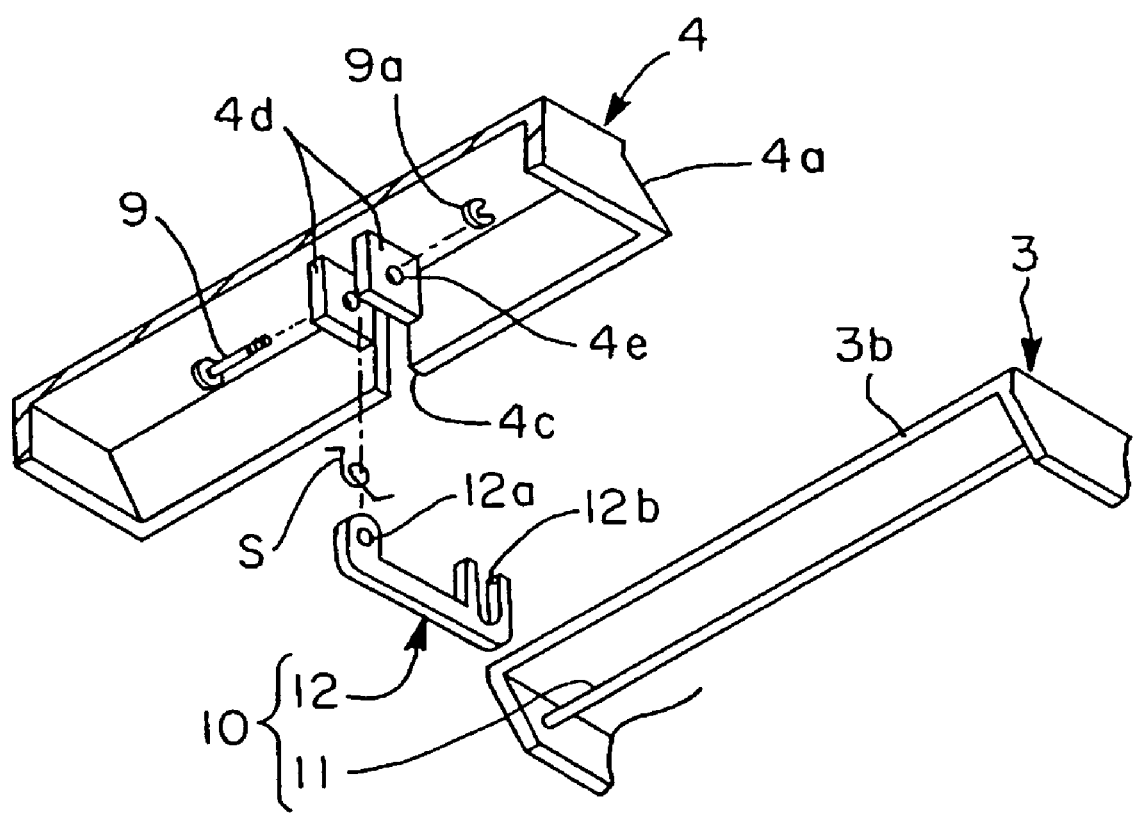
FIG. 4 is a perspective view showing engaging means shown in FIG. 3(b)

FIG. 4 is a perspective view showing engaging means shown in FIG. 3(b). FIGS. 5(a) and 5(b) are views showing an operation of the box device, wherein FIG. 5(a) is a state that the front and rear movable members are at the closed position to close an upper opening of the housing portion, and FIG. 5(b) is a state that the front and rear movable members slide from the closed position to the open position. FIGS. 6(a) and 6(b) are views showing an operation of the box device, wherein FIG. 6(a) is a state that the front and rear movable members further slide toward the open position, and FIG. 6(b) is a state that the front and rear movable members are at the open position to open the upper opening of the housing portion. In the following description, a structure of the box device will be explained, and opening and closing operations of the movable members will be explained next.

The box device includes a box body 1 having a housing portion 2 with an upper opening; a front movable member 3 and a rear movable member 4 for opening and closing the upper opening of the housing portion 2; and engaging means 10 for connecting the front and rear movable members 3 and 4 to be separable. The box device corresponds to the housing portion 53 of the center console portion 50 shown in FIGS. 7(a) to 7(c). The box device is applicable to other applications.

The box body 1 and the front and rear movable members 3 and 4 are formed of a molding resin. The box body 1 is integrally formed of a body portion 15 dividing the housing portion 2 extending in the front to rear direction, and a block portion 20 connected to the body portion 15. The body portion 15 is formed of sidewalls 16, a front wall 17, a back wall 18, and a bottom wall 19, and has a vessel shape with an upper opening. The front wall 17 is provided with a receiving portion 17a for receiving a front end of the front movable member 3. The receiving portion 17a may be omitted, or be formed of a special member. Alternatively, the receiving portion 17a may be simple locking means for engaging and releasing the front movable member 3.

The block portion 20 disposed at a side of the back wall 18 of the body portion 15 has a height slightly lower than that of the body portion 15, and has a substantially trapezoid shape with standing walls 22 extending on both sides thereof. The standing walls 22 are connected to the sidewalls 16 with same surfaces, and an upper surface 21 is situated at a level higher than the bottom wall 19 of the body portion 15. As shown in FIGS. 5(a) and 5(b), a gap 18a is formed between the back wall 18 and the upper face 21 as a doorway, and the inside of the housing portion 2 is visual from the top of the upper face 21. The gap 18a has a size such that the movable members 3 and 4 freely move between the housing portion 2 and the block portion 20 in a state that the movable member 3 and 4 are overlapped with each other.

In the sidewalls 16 of the body portion 15 and the standing walls 22 of the block portion 20, first guide grooves 5 and second guide grooves 6 are formed in the opposing inner surfaces in an opposed state, respectively. As shown in FIG. 2(a), the first guide grooves 5 are located above the second guide grooves 6, and have straight grooves horizontally extending from a front side of the housing portion 2 toward the block portion 20 to a position slightly rear side from the middle thereof. While the first guide groove 5 is one groove formed in each side, the second guide grooves 6 are two grooves formed in each side. One of the second grooves 6 (front side groove) extends from the substantially middle of the housing portion 2 to the front side of the block portion 20, and the other (backside groove) extends from the backside of the housing portion 2 to the backside of the block portion 20.

Each of the second guide grooves 6 is a nonlinear groove with a same track, and located below the first guide groove 5. The second guide groove 6 is formed of a relatively long straight groove portion having a front side extending substantially parallel to the first guide groove 5; an inclined groove portion inclined gradually downwardly toward backside; and a relatively short straight groove portion having an end side extending substantially parallel to the first guide groove 5 or the bottom face 21.

As shown in FIGS. 2(b), and 3(a) to 3(c), the front movable member 3 and the rear movable member 4 have a substantially same thickness, and when a rear end part 3b of the front movable member 3 is connected to a front end part 4a of the rear movable member 4 through the engaging means 10, the front movable member 3 is flash with the rear movable member 4 viewed from above. The movable members 3 and 4 have lengths such that the upper opening of the housing portion 2 is completely closed in the connected state, as shown in FIG. 5(a), and include holder holes 7a and 7b provided at central portions thereof for receiving a container. In the embodiment, the front and rear movable members 3 and 4 are holder plates for holding around such a container.

The front movable member 3 is provided with a holding depression 8 provided at a front upper side thereof for placing a finger to slide the movable members in the front to rear direction, and shafts 13 projecting from both sides thereof. The shafts 13 are formed of two pieces on one side, i.e. total four pieces, and engage the first guide grooves 5 to be freely slidable. Shafts 14 project from both sides of the rear movable member 4. The shafts 14 are formed of two pieces on one side, i.e. total four pieces, and engage the second guide grooves 6 to be freely slidable. The shafts 14 are disposed under the shafts 13 of the front movable member 3. The shafts 14 at the front side engage the second guide grooves 6 at the front side, and the shafts 14 at the backside engage the second guide grooves 6 at the backside.

In the embodiment, the shafts 14 engage the corresponding second guide grooves 6 separated at the front side and backside, so that the movable member 4 can slide in an approximately horizontal state even when the second guide grooves 6 are nonlinear. The both movable members 3 and 4 have inverted concave bottom surfaces, and ribs and the like for reinforcement are formed accordingly on the inverted concave bottom surfaces. As shown in FIGS. 3(a) and 3(b), the ribs disposed adjacent to the depression 8 of the front movable member 3 and at the backside are provided with notched portions 3f and 3g for receiving the locking member 12.

As shown in FIG. 4, the engaging means 10 is formed of an engaging member 11 provided at the rear end part 3b of the front movable member 3; a locking member 12 provided at the front end part 4a of the rear movable member 4; and an urging member S for urging the locking member 12 in one direction. The engaging member 11 is composed of a shaft disposed at a back inner side of the front movable member 3 and having both ends supported on the opposed, wall surface. The locking member 12 is formed in a substantially U shape having a base end at one end thereof and an engaging portion 12b at the other end. An axial hole 12a is provided in the base end. The engaging portion 12b is formed in a substantially U shape for engaging the engaging member 11.

The locking member 12 is situated between a pair of supporting ribs 4d projecting from the front inner side of the rear movable member 4 at the substantially middle thereof in the width direction. In this state, a pin 9 penetrates through a hole 4e in one of the supporting ribs 4d, a winding screw of the urging member S, the axial hole 12a, and a hole 4e in the other of the supporting ribs 4d. Further, a snap ring 9a is attached to a projecting edge of the pin 9, so that the locking member 12 is supported to be rotatable.

In the embodiment, the locking member 12 rotates upwardly by approximately 90 degrees (see FIG. 6(b)) at the front side of the rear movable member 4 (see FIG. 3(b)) through a cut off portion 4c provided in the front end part 4a of the rear movable member 4. The locking member 12 is urged in a standing direction with the urging member S.

Opening and closing operations of the housing portion 2 with the movable members 3 and 4 will be explained as well as movements of the shafts 13 and 14 and the engaging means 10 relative to the grooves, i.e. the guide portions. FIG. 5(a) shows a state that the front and rear movable members 3 and 4 are at the closed position wherein the upper opening of the housing portion 2 is completely closed like the state shown in FIG. 1(a).

In the closed position, the front movable member 3 is held horizontally in a state where the shafts 13 on both sides of the front movable member 3 engage the first guide grooves 5, and the front end of the front movable member 3 is fitted in the receiving portion 17a. The rear movable member 4 is also held horizontally in a state where the shafts 14 on both sides of the rear movable member 4 engage the second guide grooves 6 at the front and rear sides, and the rear end of the rear movable member 4 is located inside the gap 18a, i.e. the doorway formed in the block portion 20. As shown in FIG. 3(b), the movable members 3 and 4 are connected together to be on the same level through the engaging means 10.

In this structure, the movable members 3 and 4 at the front and rear sides are on the same level when the housing portion 2 is closed, thereby providing a good appearance. The movable members 3 and 4 are connected through the engaging means 10, thereby preventing an improper movement due to vibration and the like without special locking means.

FIG. 5(b) shows a state that the front and rear movable members 3 and 4 slide from the closed position to the open position. In this state, the front movable member 3 moves horizontally toward the block portion 20, i.e. the open position, along the first guide grooves 5. The rear movable member 4 moves in the same direction along the second guide grooves 6 at the front and rear sides, and moves horizontally with a downward movement according to the tracks of the grooves. In the engaging means 10, as shown FIG. 5(b), the locking member 12 gradually rotates in the uprising direction while the rear movable member 4 moves downwardly, and the engaging member 11 becomes a state that the engaging member 11 easily comes off from the U shape of the engaging portion 12b.

In the structure of the embodiment, the movable members 3 and 4 are connected through the engaging means 10, so that the rear movable member 4 slides toward the open direction when the front movable member 3 slides in the same direction, thereby providing an easy operation. The rear movable member 4 slides in the substantially horizontal state with the downward movement along the second guide grooves 6 provided at the front and rear sides, thereby providing a smooth operation and high quality.

FIG. 6(a) shows a state that the front and rear movable members 3 and 4 further slide toward the open position and the rear movable member 4 is switched to the lowest position. In this state, the front movable member 3 moves horizontally toward the block portion 20 along the first guide grooves 5, and the rear movable member 4 moves horizontally in the same direction along the second guide grooves 6 at the front and rear sides to the lowest position. In the engaging means 10, the locking member 12 rotates toward the uprising state, and the engaging member 11 is disengaged from the U shape of the engaging portion 12b.

In the structure of the embodiment, the front and rear movable members 3 and 4 automatically move above and below along the guide grooves 5 and 6. The engaging means 10 is automatically disengaged when the movable members 3 and 4 move backward toward the open position, thereby obtaining the easy operation. Incidentally, the structure is arranged such that the locking member 12 is completely disengaged from the engaging member 11 when the rear movable member 4 reaches the open position shown in FIG. 6(b).

FIG. 6(b) shows a state that the front and rear movable members 3 and 4 moves to the open position toward the block portion 20 to open the upper opening of the housing portion 2. In the open position, the engaging means 10 is disengaged and the front and rear movable members 3 and 4 are separated and disposed above and below in the block portion 20. The front movable member 3 is stopped when the shafts 13 abut against rear ends of the first guide grooves 5. The rear movable member 4 is stopped when the shafts 14 abut against rear ends of the second guide grooves 6. In the engaging means 10, as shown in FIG. 6(b), the locking member 12 rises and is held with the urging member S.

When the movable members 3 and 4 return to the closed position from the open position, the front movable member 3 is operated to move forward. After the front movable member 3 independently moves forward up to a position just before the state shown in FIG. 6(a), the engaging member 11 abuts against and engages the locking member 12 (engaging portion 12b). Accordingly, the front movable member 3 moves together with the rear movable member 4 by the engagement thereto toward the closed position shown in FIG. 5(a) through the state shown in FIG. 5(b).

Incidentally, the present invention is not limited to the embodiments described above, and can be modified. For example, the shapes of the housing portion 2, and the movable members 3 and 4 may be changed to other shapes according to an application. The locking means 10 may be integrated. The locking member 12 may be elastically held between the members, and the urging member S may be omitted. The engaging member 11 may be simplified.

Further, the movable members 3 and 4 may be a lid and the like. When the movable members 3 and 4 are formed of the holder plates like the present embodiment, auxiliary means may be provided in the housing portion 2 for changing diameters of the holder holes 7a and 7b. As the auxiliary means, third guide grooves may be provided in the opposed inner surfaces of the sidewalls 16, so that a plate member moves in the front to rear direction along the third guide grooves.

As described above, according to the embodiments of the present invention, the box device has the structure in which the movable members slide. The movable members are separated, and the good appearance is obtained when the movable members are in the closed position, and the excellent opening and closing operations are obtained. According to the embodiments of the present invention, the device has the good appearance and the good switching operation as compared to the conventional device.

While the invention has been explained with reference to the specific embodiments of the invention, the explanation is illustrative and the invention is limited only by the appended claims.

What is claimed is:

1. A box device for retaining an article, comprising:
   a box body having a housing portion with an upper opening,
   a front movable member and a rear movable member slidably installed in front and rear directions in the box body for opening and closing the upper opening of the housing portion,
   a first guide portion formed in the box body for engaging and guiding the front movable member to slide therein,
   a second guide portion formed in the box body for engaging and guiding the rear movable member to slide therein, and
   engaging means attached to the front movable member and the rear movable member for connecting and disconnecting the front and rear movable members, said engaging means connecting the front movable member and the rear movable member to be on a same level when the front and rear movable members are in a closed position, said engaging means disconnecting the front and rear movable members when the front and rear movable members are moved to an open position so that the front and rear movable members are separated and disposed above and below relative to each other at the open position.

2. A box device according to claim 1, wherein said second guide portion is situated below the first guide portion and includes a plurality of nonlinear grooves extending substantially horizontally, said rear movable member having shaft portions fitting in the second guide portion.

3. A box device according to claim 2, wherein said first guide portion includes straight groove portions extending horizontally, said front movable member having shaft portions for fitting in the first guide portions.

4. A box device according to claim 1, wherein said engaging means includes an engaging member attached to one of the front movable member and the rear movable member, and a, rotatable locking member attached to the other of the front movable member and the rear movable member, said engaging member being disengaged from the locking member when the front movable member slides from the closed position to the open position and engaging the locking member when the front movable member slides from the open position to the closed position.

5. A box device according to claim 1, wherein said box body includes a block portion provided at a backside of the housing portion, and said first guide portion and said second guide portion extend from the housing portion to the block portion.

6. A box device according to claim 1, wherein at least one of said front movable member and said rear movable member includes a holder hole for holding a container.

* * * * *